United States Patent [19]
Cooper et al.

[11] Patent Number: 6,055,547
[45] Date of Patent: Apr. 25, 2000

[54] SHARED FILE ALLOCATION AND RELEASE

[75] Inventors: Thomas P. Cooper, New Brighton; Michael J. Hill, Vadnais Heights; Dennis R. Konrad, Welch; Thomas L. Nowatzki, Shoreview, all of Minn.

[73] Assignee: Unisys Corporation, Blue Bell, Pa.

[21] Appl. No.: 09/001,137

[22] Filed: Dec. 30, 1997

[51] Int. Cl.[7] ...................................................... G06F 17/30
[52] U.S. Cl. ...................... 707/204; 395/200.59; 709/219
[58] Field of Search .......................... 707/1–10, 100–104, 707/200–206; 395/200.59, 671, 676; 370/352, 400, 427

[56] References Cited

U.S. PATENT DOCUMENTS

| | | | |
|---|---|---|---|
| 5,694,601 | 12/1997 | White | 395/671 |
| 5,754,845 | 5/1998 | White | 707/10 |
| 5,771,354 | 6/1998 | Crawford | 395/200.9 |
| 5,819,089 | 10/1998 | White | 395/676 |
| 5,826,270 | 10/1998 | Rutkowski et al. | 707/10 |
| 5,893,086 | 4/1999 | Schmuck et al. | 707/1 |

*Primary Examiner*—Ruay Lian Ho
*Attorney, Agent, or Firm*—Charles A. Johnson; Mark T. Starr; Nawrocki, Rooney & Sivertson, P.A.

[57] ABSTRACT

Method and apparatus for managing the allocation and release of memory space within a number of files shared by a number of hosts in a data processing system. A number of allocate and release tables are provided which are accessible by the number of hosts for managing the allocation and release of space within the number of files. Each one of the number of allocate and release tables corresponds to one of the number of files and provides a file location, file size, and indication to the number of hosts of which of the number of blocks within the file have been allocated and which of the number of blocks have been released. Any host may allocate one or more of the number of blocks to store messages created or received by the host by determining from the allocate and release tables which one or more of the number of blocks within one of the number of files are available. The host may then release the one or more of the number of blocks once the one or more of the number of blocks are no longer required to store the message. Once the one or more of the number of blocks are released, any of the number of hosts may allocate and release additional messages.

22 Claims, 12 Drawing Sheets

SHARED FILE ALLOCATION AND RELEASE

CROSS REFERENCE TO CO-PENDING APPLICATIONS

The present application is related to U.S. patent application Ser. No. 08/397,429, filed Mar. 1, 1995 entitled "Method for Making a Database Available to a User Program During Database Recovery", U.S. patent application Ser. No. 08/174,750, filed Dec. 23, 1993, entitled "Outboard File Cache System", and U.S. patent application Ser. No. 08/745,111, filed Nov. 7, 1996, entitled "Extended Processing Complex for File Caching", which is a continuation of Ser. No. 08/173,459, filed Dec. 23, 1993, entitled "Extended Processing Complex for File Caching", all assigned to the assignee of the present invention and all incorporated herein by reference.

BACKGROUND OF THE INVENTION

1. Field of the Invention

The present invention generally relates to digital data processing systems, and more particularly, to such systems that allow recoverable messages to be safely used when a common database is being updated by multiple hosts.

2. Description of the Prior Art

Data processing systems are often used in the prior art to perform high volume transaction processing operations. These operations typically include database and message recovery operations in multiple host system environments. Transaction programs may reside on one or more hosts. The transaction program may retrieve or process source input messages, including messages created by a user, another application program, etc. The transaction programs may also create one or more destination output messages. These output messages may be transmitted to a user, or provided as input messages to other transactions.

Often, one or more users may be coupled to a given host, where a message system resident on each of the hosts manages the storage and retrieval of the input and output messages for the corresponding host. Messages sent by the users are often retained by the message system of the corresponding host. The message system then controls the storage of message text in file space which has been allocated to store the messages. The allocated file space is often resident on a disc drive storage device which is coupled to each of the hosts.

Input messages sent from the user are passed to the corresponding message system resident on the corresponding host. Once the message system has saved the message, the message is held until an appropriate application is available to read and process the message. When available, the application calls the message system and processes the message. Output messages created by the application are also passed to the corresponding message system before being transferred to an intended user. Once the transaction program has completed processing the input message, or once the output message has been sent to the user, the message system releases the message file space for reuse.

In the prior art, each message system on each host typically keeps track of the allocated file space for messages received by the corresponding host. Thus, if a particular host experienced a failure, a user that has submitted a transaction to the host must wait for the host to recover before the transaction can be completed. In high volume transaction processing, a user often cannot wait for the failed host to recover. For example, if the user accessed the failed host through an automatic teller machine, it would be inappropriate to wait for the host to recover before successfully completing the transaction. Since the messages managed by the failed host are not generally accessible by other hosts, the user generally cannot complete the transaction until that host is restored.

SUMMARY OF THE INVENTION

The present invention overcomes many of the disadvantages associated with the prior art by providing a method and apparatus for managing the allocation and release of memory space within files shared by a number of hosts. In the preferred embodiment, the data processing system is operating in a transaction processing environment where a number of hosts are executing one or more applications. A number of allocation tables are provided which can be accessible by the number of hosts for managing the allocation and release of space within the files.

In the preferred embodiment, each of the number of allocation tables corresponds to a file space, and provides a file location, a file size, a block size, and an indication to the hosts as to which blocks have been allocated and which blocks have been released. Each file has a number of blocks. Any host may reserve by allocation one or more of the blocks within the files for storing messages created by or received from the host by determining from the allocation tables which of the files and which of the blocks within the files are available. After the blocks within the files have been allocated, any host may access the allocation tables to manage the allocation and release of memory space within the files. Any host may release one or more blocks once those blocks are no longer needed to store the message. After the selected blocks within the selected files are released, any of the hosts may allocate and release additional messages within the previously released block space.

In the preferred embodiment, each allocate and release table includes a file location and a file size. The host may determine from the file location and file size which files to reserve by allocation. Each allocate and release table further provides the number of blocks within each file and provides an indication of which of these blocks have been reserved by allocation. Each allocate and release table also provides an indication of which of the files have been released. Finally, each block may provide a link to other blocks, where the links indicate which other blocks have been reserved by allocation to store a message.

Preferably, the number of allocate and release tables reside in an extended processing complex. When a new input message is received or a new output message is created, the processing host allocates blocks within the file space by calling the extended processing complex for the appropriate message file. In one approach, the processing host determines the size of, or stages the entire message, before calling the extended processing complex. The extended processing complex then allocates a number of contiguous block entries within a given file to accommodate the message. The extended processing complex may also allocate non-contiguous entries. In another approach, the messages may be allocated on a circular basis within each file. This helps use the file space more fully before reusing previously released file space. Circular allocation is useful in applications where previous messages can be recalled for a period of time if the message file space has not been reused.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
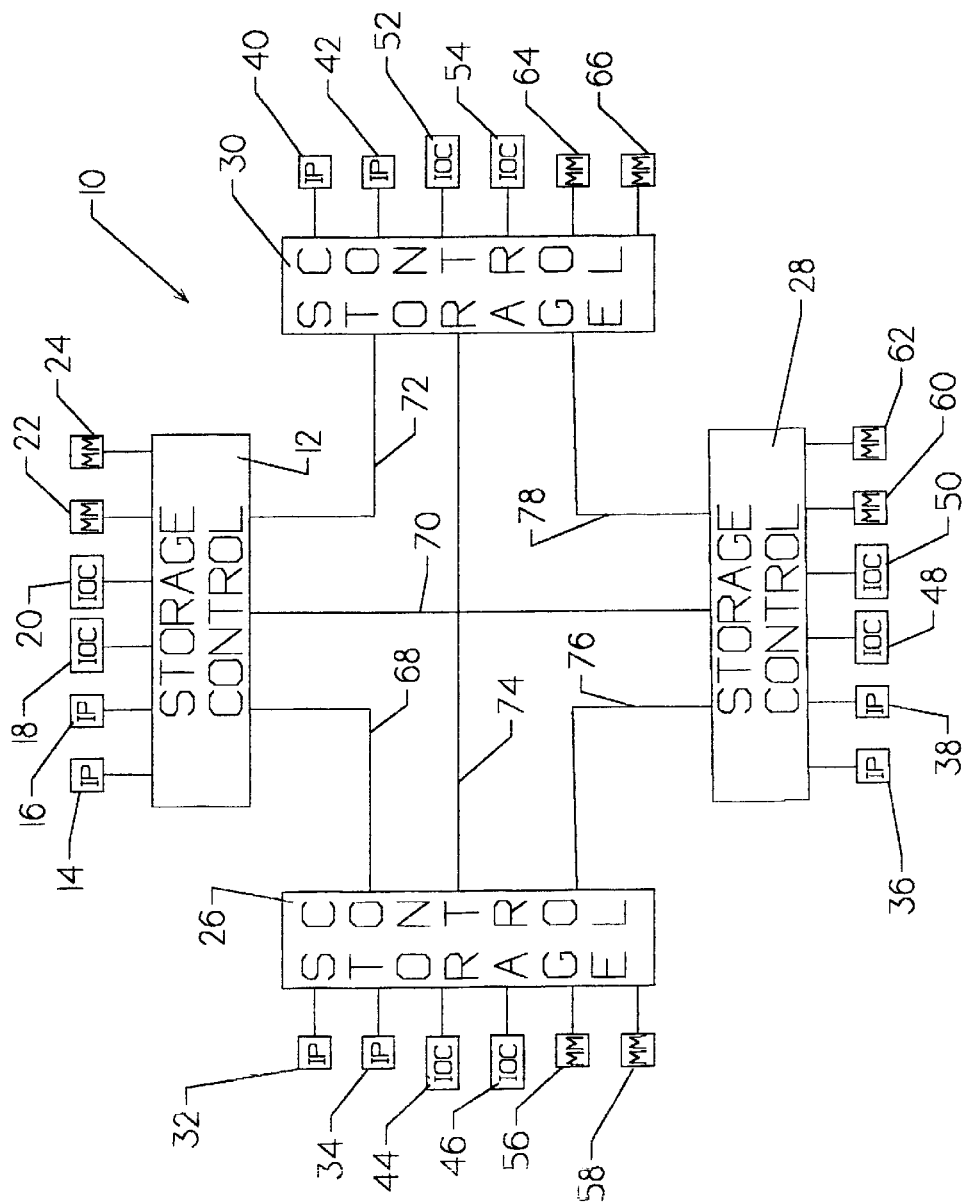
FIG. 1 is a block diagram of the preferred host data processing system in which the present invention is implemented.

FIG. 1 is a schematic diagram of the preferred data processing system 10 in which the present invention may be utilized. It is recognized that the present invention may be utilized in any data processing system which performs transaction processing operations including database and message recovery in multiple host system environments. In the exemplary embodiment, data processing system 10 may include four independent operating environments each having their own storage controller and point-to-point communications with the other independent operating environments via a storage controller to storage controller interface. Each independent operating environment is referred to as a partition. A partition has its own operating system software which manages the allocation of resources within the partition. Because a partition has its own operating system, it may be referred to as a data processing system. Thus data processing system 10 may be partitioned into four data processing systems: a first data processing system having the resources accompanying storage controller 12, a second data processing system having the resources accompanying storage controller 26, a third data processing system having the resources accompanying storage controller 28, and a fourth data processing system having the resources accompanying storage controller 30.

Each data processing system or partition may further be contained within a unique power domain. For example, the power source for the first data processing system would be independent from the power source for the second data processing system, the third data processing system, and the fourth data processing system. A loss of power within one power domain would not affect the power source within any other power domain.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output complex 18, input/output complex 20, main memory module 22 and main memory module 24. Each of instruction processors 14 and 16 (along with similar instruction processors 32, 34, 36, 38, 40, and 42) has internal dedicated cache resources in the form of an instruction cache and an operand cache.

Input/output complexes 18 and 20, along with main memory modules 22 and 24, may be elements currently available, such as found in the Unisys Model 2200/600 series. Input/output complexes 44, 46, 48, 50, 52, and 54 and main memory modules 56, 58, 60, 62, 64, and 66 may be similarly found. Each of the input/output complexes 18, 20, 44, 46, 48, 50, 52, and 54 may contain multiple input/output processors (see also, FIG. 4). The input/output processors read data from main memory modules 22, 24, 56, 58, 60, 62, 64, and 66 to write to the peripheral devices, and read data from the peripheral devices to write to the main memory modules. Peripheral devices may include printers, tape drives, disk drives, network communication processors etc.

Storage controllers 12, 26, 28, and 30 may each control a separate database. For example, storage controller 12 may store a first database in memory modules 22 and 24. Similarly, storage controller 26 may store a second database in memory modules 56 and 58, storage controller 28 may store a third database in memory modules 60 and 62, and storage controller 30 may store a fourth database in memory modules 64 and 66. Any instruction processor nay access any database. For example, instruction processors 14 and 16 may access any of the databases stored in memory modules 22, 24, 56, 58, 60, 62, 64, and 66, via interfaces 68, 70, 72, 74, 76, and 78.

Figure 2:
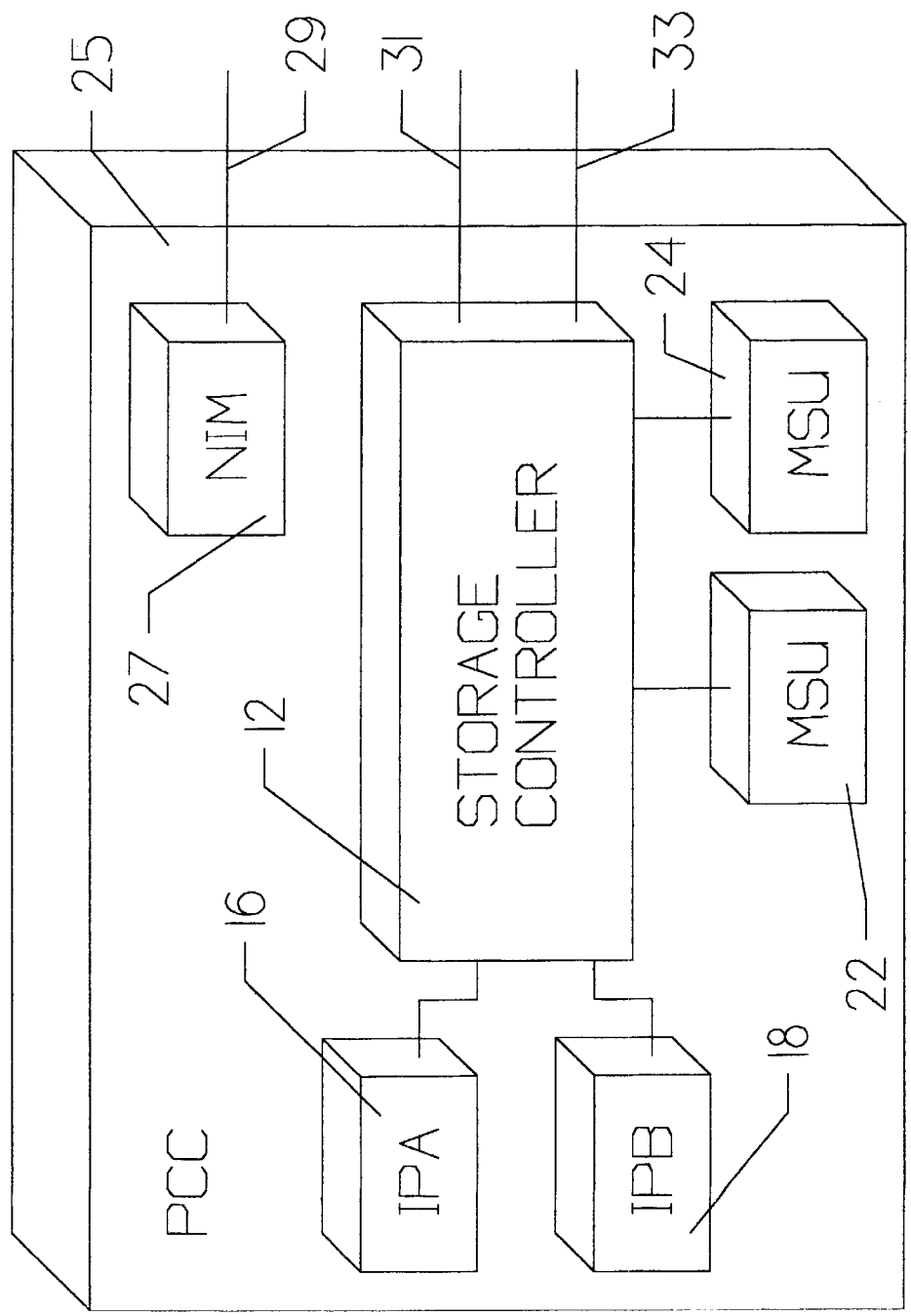
FIG. 2 is a pictorial diagram showing the packaging arrangement of the host processing system of FIG. 1.

FIG. 2 is a schematic diagram showing the packaging of a portion of data processing system 10. A major physical element of data processing system 10 is Processing Complex Cabinet (PCC) 25. Within fully populated PCC 25 is located instruction processors 16 and 18 (i.e. IPA and IPB). In the preferred mode, each of these instruction processors is packaged on a single high density circuit board. The memory storage units 22 and 24 are coupled to storage controller 12 as explained above.

Network interface module 27 provides an interface to the operator console via cable 29. Cables 31 and 33 couple input/output complexes 18 and 20 to storage controller 12 (see also, FIG. 1). Other referenced elements are as previously described.

Figure 3:
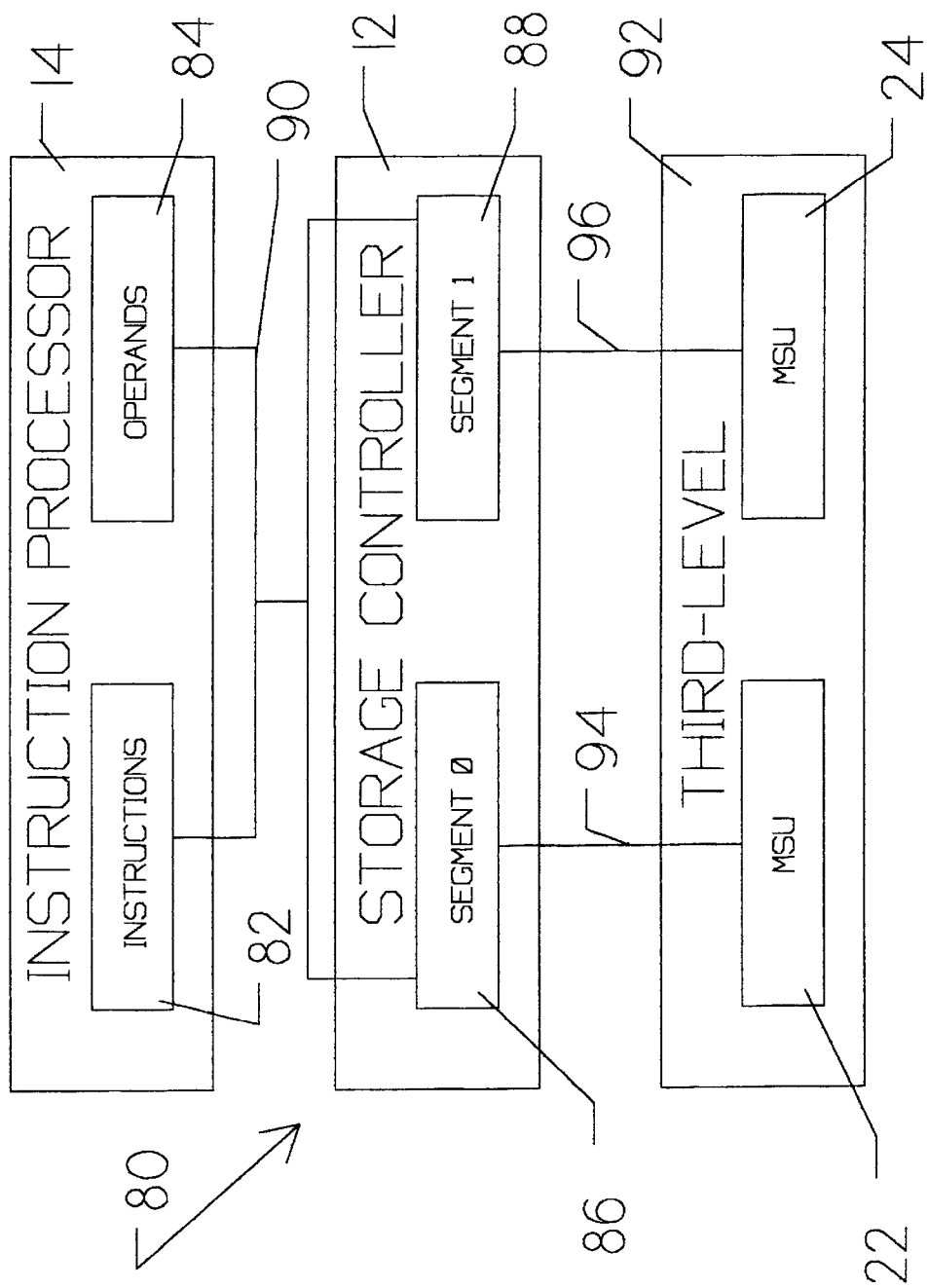
FIG. 3 is a block diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8 k of 36 bit words. These are internal to instruction processor 14 and dedicated to the operations undertaken therein. By partitioning the internal dedicated cache resources in this manner, there is a certain concurrency of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36 bit words containing the desired data element.

Storage controller 12 contains an intermediate level cache segment of 128 k 36 bit words for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output complexes, and three other storage controllers (see also, FIG. 1). Each data element request is divided between segment 0 cache 86 and segment 1 cache 88 based upon the requested address. Only if the requested data element is not validly present in the appropriate intermediate level cache resource is an access request made to third level 92.

Figure 4:
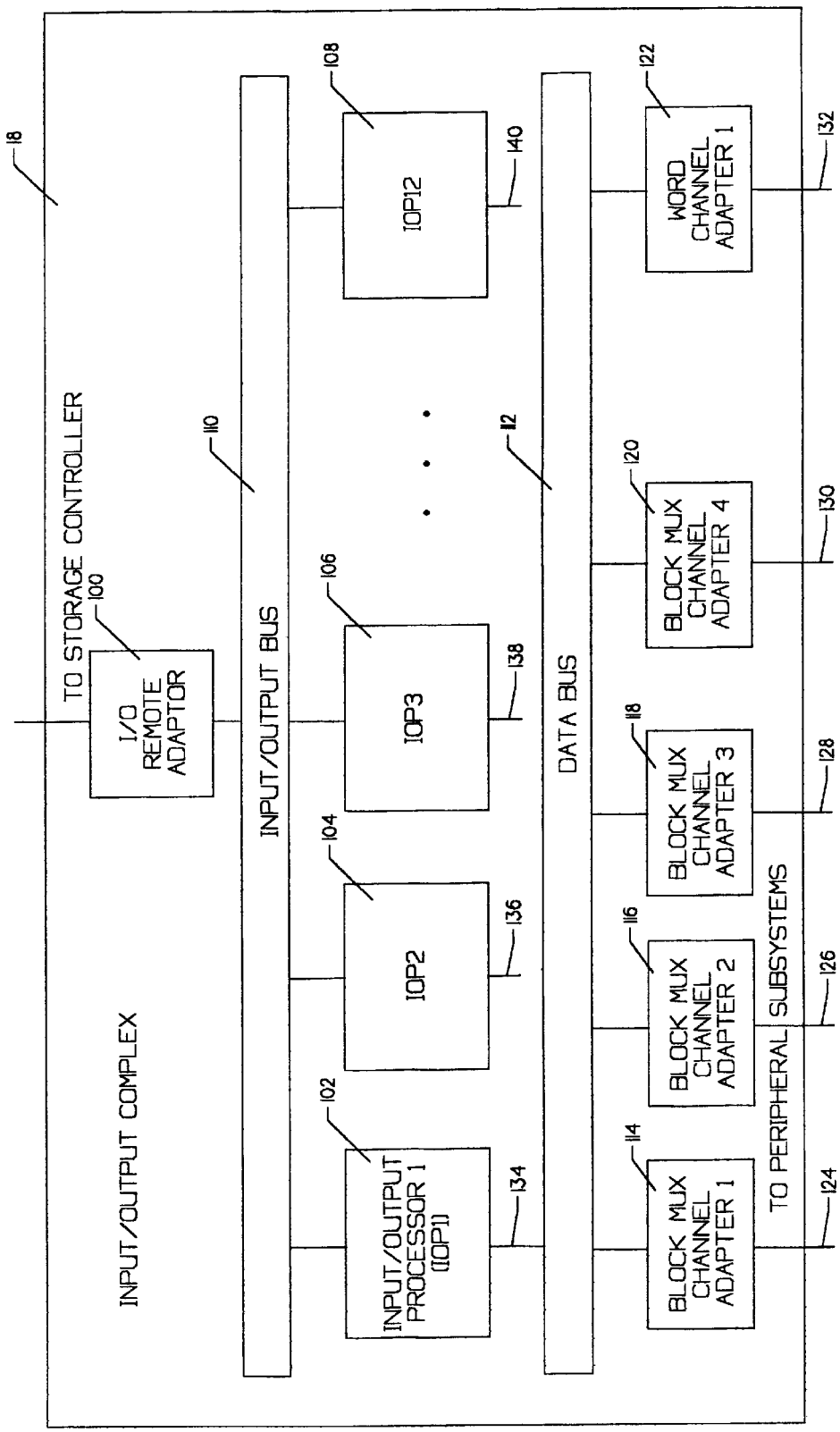
FIG. 4 is a block diagram showing the architecture of an input/output complex of the exemplary host.

FIG. 4 shows the architecture of an input/output complex 18 of data processing system 10. It is understood that input/output complex 18 is representative of input/output complexes 18, 20, 44, 46, 48, 50, 52, and 54. Input/output remote adaptor 100 is a non-intelligent adaptor which transfers data and messages between an associated storage controller (e.g., storage controller 12) and an associated input/output processor. The associated input/output processors are input/output processor 1 102, input/output processor 2 104, and input/output processor 3 106 through input/output processor 12 108. The data and messages are transferred to the associated input/output processor via an input/output bus 110.

Input/output remote adaptor 100 occupies one physical dropout of the thirteen available on input/output bus 110, and has the highest priority of any unit connected to input/output bus 110. Input/output remote adaptor 100 does not participate in a rotational priority operation and can gain access to input/output bus 110 through a normal request process even when other units coupled to input/output bus 110 are operating in a rotational priority mode.

Input/output bus 110 provides a communication path and protocol to transfer data between the attached units. Input/output bus 110 can accommodate twelve input/output processors. It is understood that bus architectures are well known in the prior art, and a further discussion of input/output bus 110 is not necessary for the purposes of the present invention.

Input/output processors 102, 104, and 106 through 108 are microprocessor controlled units that control the initiation, data transfer, and termination sequences associated with software generated I/O channel programs. Initiation and termination sequences are executed by the microprocessor (not shown), and data transfer is controlled by hard-wire logic (not shown). Each of input/output processor 102, 104, and 106 through 108 is coupled to a data bus 112, which in turn has available slots for up to four block space MUX channel adaptors labeled 114, 116, 118 and 120. Data bus 112 is also coupled to a word channel adaptor 122. Block MUX channel adaptor 1 114, block MUX channel adaptor 2 116, block MUX channel adaptor 3 118, block MUX channel adaptor 4 120 and word channel adaptor 1 122 are coupled to their respective peripheral subsystems (not shown) via interfaces 124, 126, 128, 130 and 132, respectively.

Input/output processor 1 102 is shown coupled to data bus 112 via interface 134. It is understood that input/output processor 2 104, and input/output processor 3 106 through input/output processor 12 108 are each coupled to an associated data bus (not shown). The other eleven data buses which are not shown provide connections for additional channel adaptors. Interfaces 136, and 138 through 140 represent the coupling between input/output processor 2 104, and input/output processor 3 106 through input/output processor 12 108, respectively, and their associated data buses.

Figure 5:
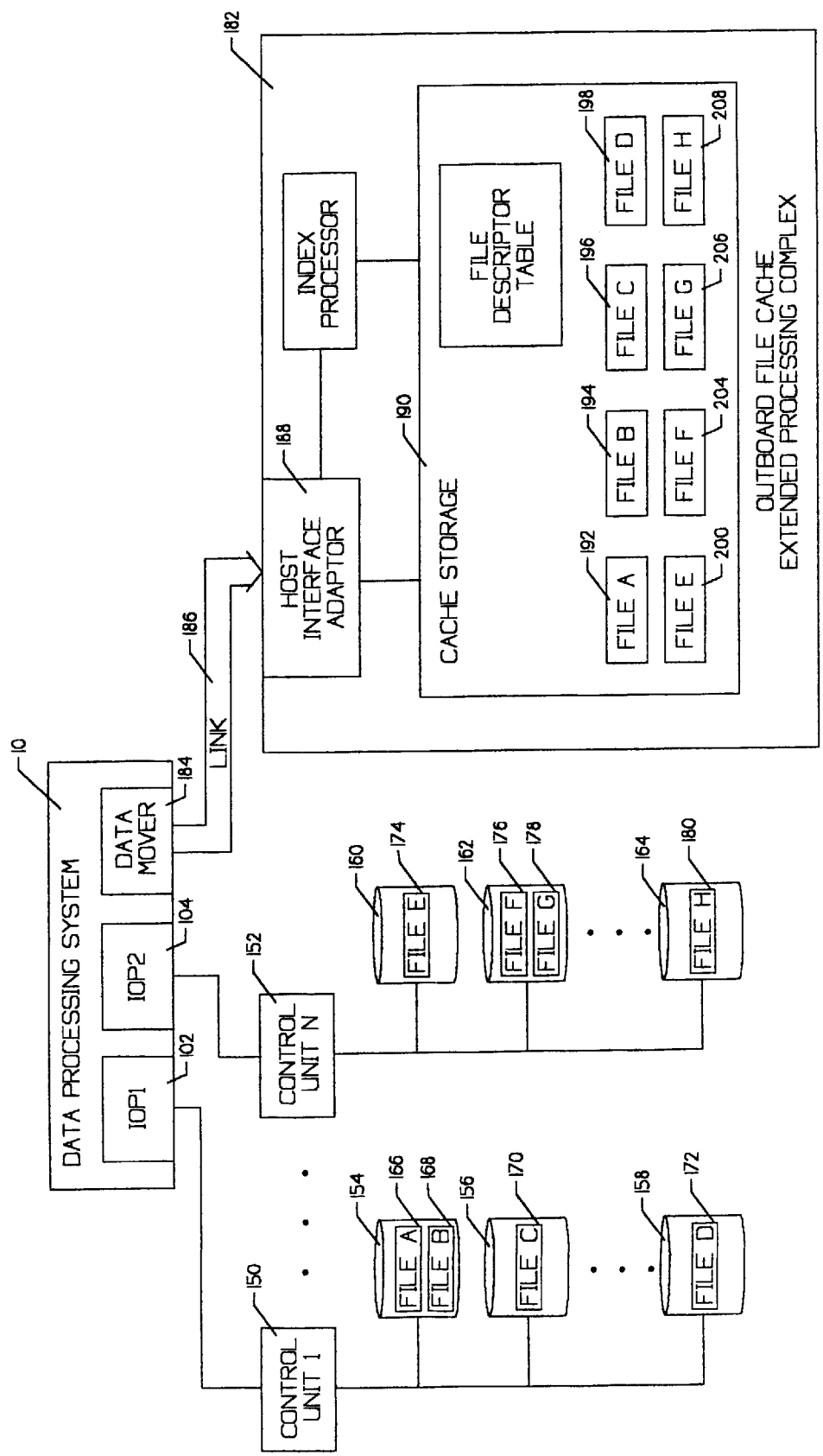
FIG. 5 is a block diagram of the outboard file cache in a data storage hierarchy.

FIG. 5 illustrates an outboard file cache in a data storage hierarchy. A plurality of control units labeled 150 through 152 are coupled to data processing system 10 via input/output processor 1 102 and input/output processor 2 104, respectively, for providing access to discs 154, 156 through 158, 160, and 162 through 164. Application and system software executing on data processing system 10 reads data from and writes data to files 166, 168, 170, 172, 174, 176, 178 and 180. While these files are depicted as blocks, it should be understood that the data is not necessarily stored contiguously on discs 154, 156 through 158, 160, and 162 through 164. These discs provide a backing store for retaining the files. In the storage hierarchy, discs would fall into the category of backup or secondary storage, with primary storage being the main memory modules of data processing system 10.

Extended processing complex 182 is an outboard cache storage for discs 154, 156 through 158, 160, and 162 through 164, having resiliency against data loss. A data mover 184 is coupled to input/output bus 110 (see FIG. 4) and provides a functionality which is similar to an input/output processor such as input/output processor 1 102. Data mover 184 provides a closely coupled, direct, high-speed communications link 186 to host interface adaptor 188 within extended processing complex 182.

All or part of files 166, 168, 170, 172, 174, 176, 178 and 180 may be stored within cache storage 190. The portion of files 166, 168, 170, 172, 174, 176, 178 and 180 that are stored in cache storage 190 are shown respectively as blocks 192, 194, 196, 198, 200, 204, 206 and 208. The cache portion of files 166, 168, 170, 172, 174, 176, 178 and 180 are labeled respectively as "file A", "file B", "file C", "file D", "file E", "file F", "file G", and "file H" for discussion purposes. Thus file A 166 is all or the portion of file A that is stored in file A 192. File B 168 is all or the portion of file B that is stored in File B 194, and so on for files C through H, respectively. Extended processing complex 182 allows references to cache files to be immediately directed to cache storage 190 for processing. It is also understood that cache storage 190 may be a non-volatile memory.

A more detailed discussion of the outboard file cache and the extended processing complex may be found in U.S.

patent application Ser. No. 08/174,750, filed Dec. 23, 1993, entitled "Outboard File Cache System", and U.S. patent application Ser. No. 08/745,111, filed Nov. 7, 1996, entitled "Extended Processing Complex for File Caching", which have been incorporated herein by reference.

Figure 6:
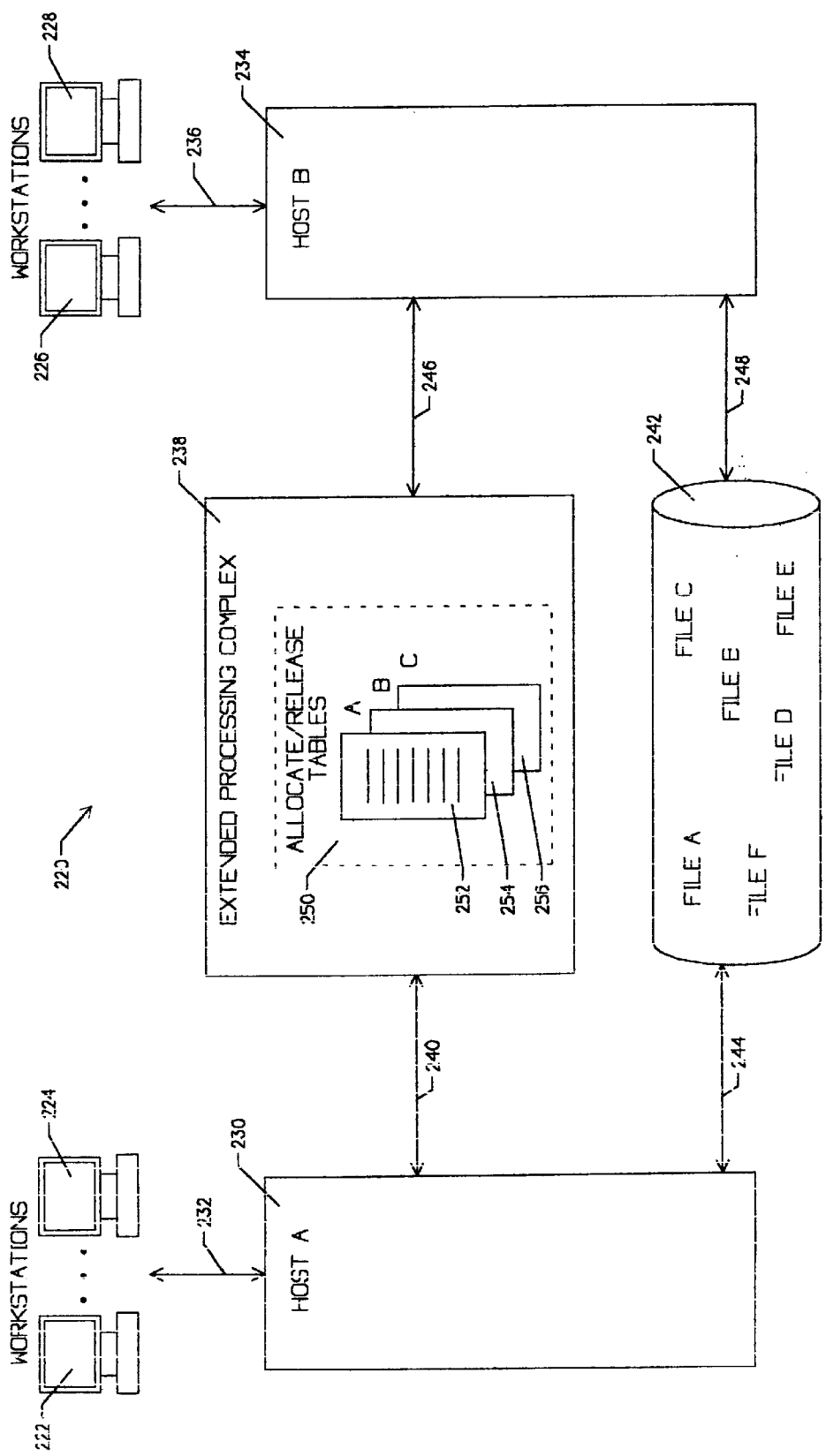
FIG. 6 is a block diagram showing an exemplary embodiment of the present invention.

FIG. 6 is a block diagram showing an exemplary embodiment of the present invention. The block diagram is shown generally at 220. In high volume transaction operations, there may be one or more input terminals or work stations coupled to one or more host computing systems. In the diagram at 220, workstation 222 through workstation 234 are coupled to a host A 230 via path 232. Workstations 226 through workstation 228 are coupled to host B 234 via path 236. It is understood that workstation 222 through workstation 224 may represent any number of workstations which are coupled to host A 230. Likewise, workstation 226 through workstation 228 may represent any number of workstations which are coupled to host B 234.

It is understood that path 232 and path 236 may represent any number of communication links which are well known in the art for high volume transaction processing. These may include, but are not limited to, local area networks, telephone line linkages, or any other means which provide interconnection for a number of diverse workstation locations which communicate to centrally located host processors.

Although only host A 230 and host B 234 are shown in FIG. 6, it is understood that any number of hosts may be used in the transaction processing environment. It is further understood that host A 230 and host B 234 may each be in independent operating environments. For example, each host may be in an independent operating environment in a data processing system 10 as disclosed in FIG. 1. Furthermore, one or more of the hosts may be within separate data processing systems 10 which may communicate through storage controller-to-storage controller interfaces.

Host A 230 and host B 234 may be coupled to a common memory or database, wherein transactions being processed by host A 230 and host B 234 update the one or more common databases. It is understood that these common databases may be any of the memory resources within data processing system 10, such as main memory modules 22, 24, 56, 58, 60, 62, 64, 66, as shown in FIG. 1. It is further understood that the one or more common databases may be any of the memory resources within the extended processing complex 182, such as cache storage 190, which is shown in FIG. 5.

Host A 230 is coupled to extended processing complex 238 via interface 240. In addition, host A 230 is coupled to memory storage 242 via interface 244. Memory storage 242 may be any memory within data processing system 10. This includes main memory modules 22, 24, 56, 58, 60, 62, 64, or 66, or alternatively, include any number of disc storage devices.

Host B 234 is coupled to extended processing complex 238 via interface 246. In addition, host B 234 is coupled to memory storage 242 via interface 248. Extended processing complex 238 may be located with any of the independent operating environments or partitions within data processing system 10, and host A 230 and host B 234 may be located within the same or any other independent operating environment within data processing system 10.

In the preferred embodiment, extended processing complex 238 has allocate and release tables 250. Allocate and release tables 250 are comprised of a number of tables herein shown as table A 252, table B 254, and table C 256. It is understood that these tables may correspond to file A 192, file B 194, and file C 196, respectively, within cache storage 190 of extended processing complex 182 as shown in FIG. 5. Furthermore, memory storage 242 contains file A, file B and file C which may correspond respectively to table A 252, table B 254, or table C 256. It is understood that in the preferred embodiment, table A 252 corresponds to file A 192 by managing the allocation release of space within file A 192. Likewise, table B 254 and table C 256 correspond to file B 194 and file C 196 by managing the allocation release of space within file B 194 and file C 196.

In multi-host applications, it is frequency required to efficiently manage the allocation and release of files which are shared between the multiple hosts. In these applications, the input message being received may be secured by one host, such as host A 230, and subsequently released upon transaction termination by a different host, such as host B 234. Using shared files to secure (i.e., allocate and populate) and access (i.e., process and release) the messages, it is desirable that the overhead of managing the allocation and release is not prohibitive. In the multiple host transaction application shown at 220, transaction messages received and processed by host A 230 will be retained if a failure occurs in host A 230. In the preferred embodiment, the in-progress messages are available to be transferred and recovered by host B 234 since the allocation and release of file space is controlled by allocate and release tables 250 within extended processing complex 238. The in-progress messages can be transferred to host B 234 without having to interact with host A 230 after it has recovered. Thus, the allocate and release tables 250 manage the allocation and release of space within shared files as these files may be accessed by host A 230, host B 234 or any number of hosts. This because the extended processing complex 238 is accessible from all hosts in a multiple host application, and thus, can coordinate the file space allocation and release without adding communication overhead between the hosts (see also, FIGS. 1 and 5).

Figure 7:
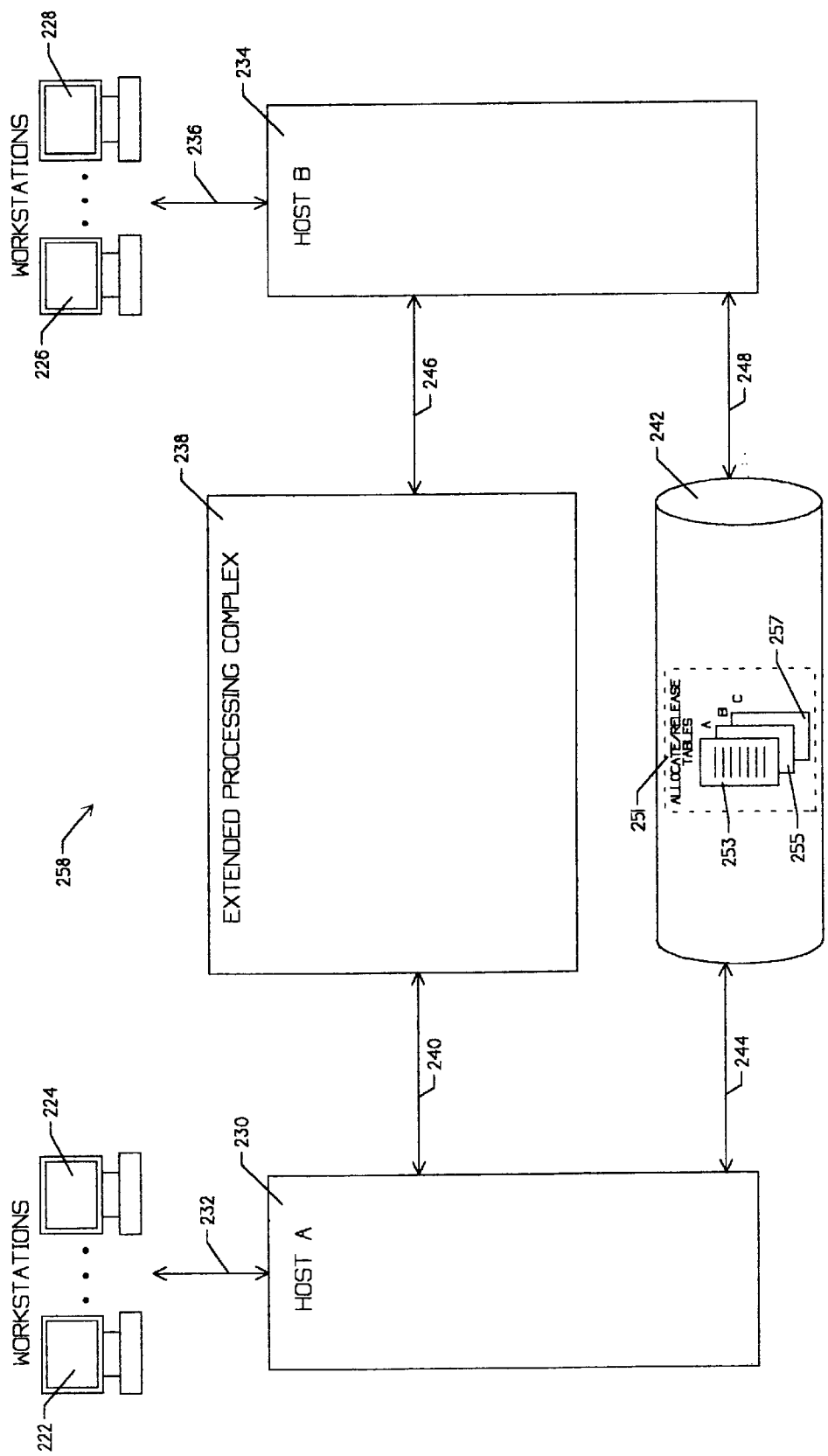
FIG. 7 is a block diagram showing an alternative embodiment of the present invention.

FIG. 7 is a block diagram showing an alternative embodiment of the present invention. The block diagram is shown generally at 258. The diagram at 258 is similar to the diagram at 220 shown in FIG. 6 with one exception. In FIG. 7, in the alternative embodiment, the allocate and release tables are contained within memory storage 242, rather than extended processing complex 238. Memory storage 242 has allocate and release tables 251. Allocate and release tables 251 contain representative tables A 253, B 255, and C 257 which manage the allocate and release of file space. Thus, table A 253, table B 255 and table C 257 may correspond to and control file A, file B, and file C contained within memory storage 242, or alternatively, may control file A 192, file B 194 and file C 196 contained within cache storage 190 of extended processing complex 182 as shown in FIG. 5 (see also, FIG. 6).

It is understood as discussed in FIG. 6 and FIG. 1 that memory storage 242 may be accessible from any host, including host A 230 and host B 234. Thus, it is further understood that the allocate and release tables may then be contained within any globally accessible memory which is accessible by any number of hosts. It is further understood that allocate and release tables 251 may be located within any of the independent operating environments or partitions within data processing system 10, as these may be accessed by any other independent operating environment within data processing system 10, as discussed in reference to FIG. 1.

Figure 8:
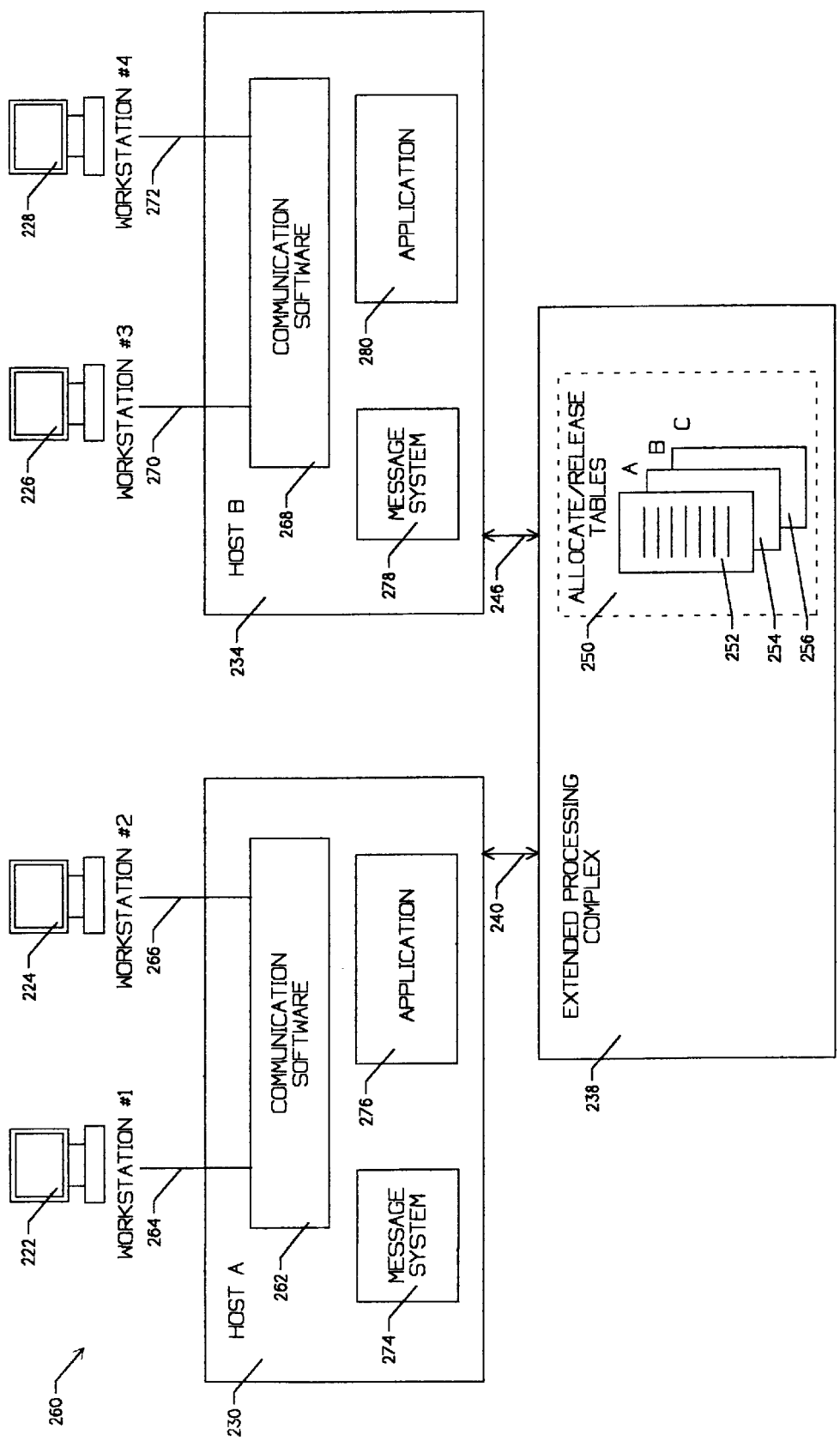
FIG. 8 is a detailed block diagram showing an exemplary embodiment of the present invention.

FIG. 8 is a detailed block diagram showing an exemplary embodiment of the present invention. The detailed diagram is shown generally at 260 and includes workstation 222, workstation 224, workstation 226, and workstation 228. Workstations 222 and 224 are exemplary workstations which are communicating with host A 230 via interfaces 264 and 266, respectively. Likewise, workstation 226 and workstation 228 are exemplary workstations which are communicating with host B 234 via interfaces 270 and 272, respectively. Interface 264 and interface 266 are coupled to communication software 262.

In the transaction application environment, there may be several instances of communication software which support communication between the workstations and the current application. Workstations 270 and 272 are coupled to communication software 268 via interfaces 270 and 272, respectively. It is understood that application 276 within host A 230 and application 280 within host B 234 may be concurrent applications. Thus, communication software 262 supports communication between workstations 222 and 224 in application 276. Likewise communication software 268 supports communication between workstations 226 and 228 in application 280.

In the transaction processing environment, as applications 276 and 280 may be part of the concurrent application, a common database may currently be under update from multiple hosts, which herein include host A 230 and host B 234. The common database may be contained in any one of hosts A 230 or host B 234 or within any memory resource within data processing system 10. It is understood that any host may access the memory resources of any other hosts (see also, FIG. 1). Thus, it is not necessary that the common database or memory reside within any particular host.

In the transaction processing environment, applications 276 and 280 may process one or more input messages from workstations 222, 224, 226 or 228. The input messages may include a network input message created by one of the workstations, or, for example, by an automatic teller machine. These input messages may include messages created by another application program residing on another host. These input messages may also include a check point message created during the execution of either application 276 or application 280. Message system 274 resides within host A 230, and receives and holds the input message until application 276 calls message system 274 to read the message. Likewise, message system 278 within host B 234 receives input messages and holds the messages until application 280 calls message system 278 to read the message. Once application 276 or application 280 reads the respective message, the message may be processed.

In the transaction processing environment, application 276 or application 280 being executed may create many types of output messages to be released to the corresponding workstation or user. For example, a network output message may be created which is to be transmitted to a workstation or automatic teller machine. A pass-off message may be created which becomes an input message for another application program resident on another host, such as when host A 230 creates a pass-off message for host B 234. The output message may also be a check point message which replaces the input message for either executing application 276 or 280 at its next respective intermediate commit point.

Extended processing complex 238 is coupled to host A 230 via interface 240. Extended processing complex 238 is also coupled to host B 234 via interface 246. It is understood that extended processing complex 238 may be coupled to any number of hosts in the preferred embodiment of the present invention. (See also, FIGS. 1 and 5.)

Extended processing complex 238 further contains allocate and release tables 250. Allocate and release tables 250 comprise a number of allocate and release tables which manage the allocation and release of space within a number of files which are accessible and shared by host A 230 and host B 234. In the preferred embodiment, each one of the number of allocate and release tables 250 corresponds to one of the number of files. Allocate and release tables 250 is comprised of table A 252, table B 254, and table C 256, which are exemplary. In the preferred embodiment, table A 252, table B 254 and table C 256 may each correspond to one of a number of files also resident in extended processing complex 238. For example, table A 252 may correspond to file A 192 within cache storage 190 (see also, FIG. 5). Likewise, table B 254 and table C 256 may correspond to file B 194 and file C 196, also within cache storage 190. File A 192, file B 194 and file C 196 may store messages. These messages may comprise input and output messages. Host A 230 and host B 234 may determine from table A 252, table B 254 and table C 256 which one of file A 192, file B 194 or file C 196 in which to store one or more messages.

Figure 9:
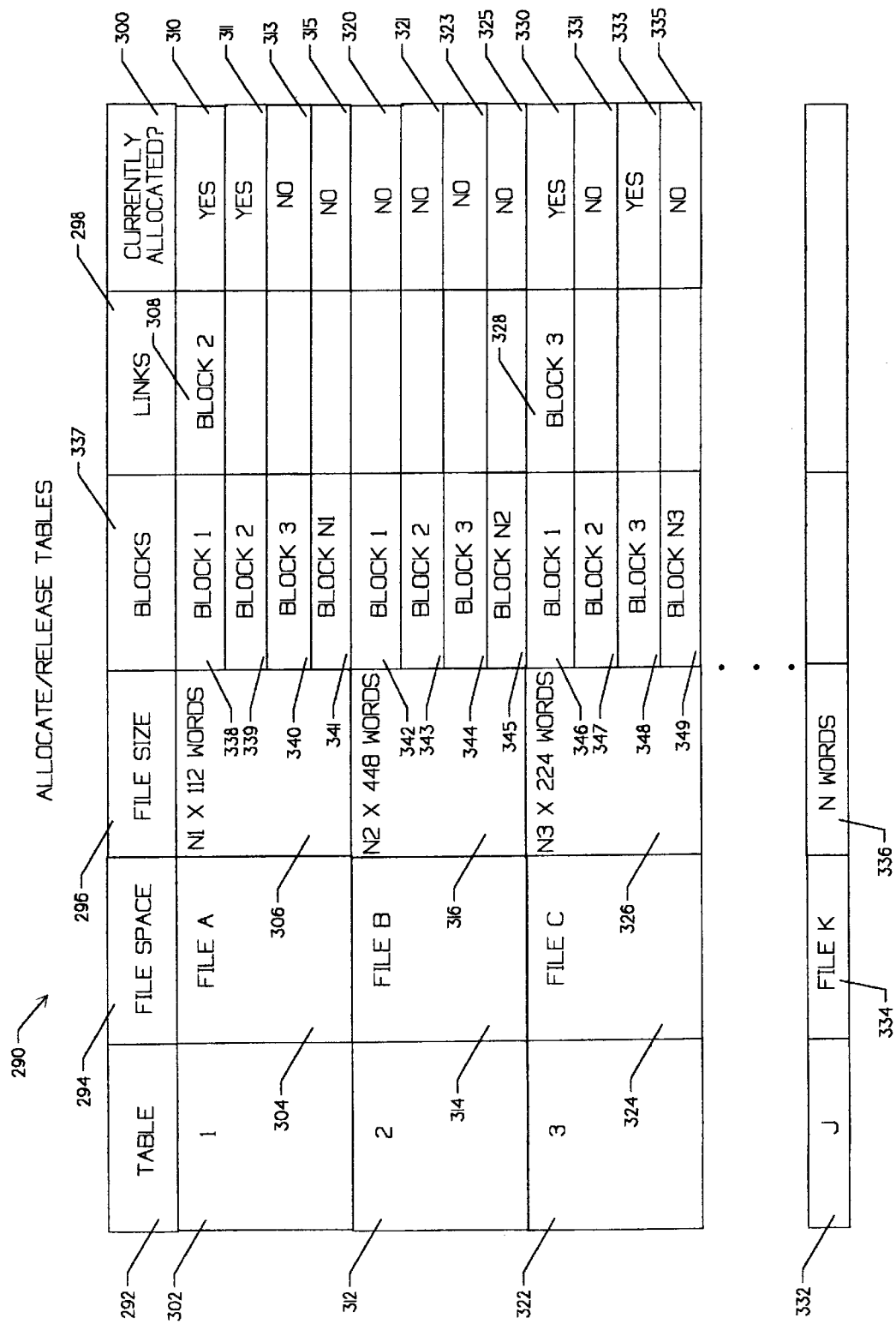
FIG. 9 is a table showing a mapping of the allocation and release of a number of files for the allocation/release tables shown in FIG. 6, FIG. 7, and FIG. 8.

FIG. 9 is a table showing a mapping of the allocation and release of a number of files for the allocation/release tables shown in FIG. 6, FIG. 7, and FIG. 8. The allocate and release tables at 290 are representative of a preferred embodiment of the present invention. A first column is shown at 292 which indicates the table instance. Each entry in the first column at 292 represents a particular table which corresponds to a particular file. A second column is shown at 294 which is a reference to the file in which the allocate and release table manages the allocation and release of messages. The entries within the column at 294 indicate a memory address where the file space may be found. A third column is shown at 296 and is the size of the corresponding file in the column at 294. The size of the file may be preregistered to indicate the maximum capacity of the particular file. The fourth column at 337 represents the number of blocks within the corresponding file in which data can be allocated and released. The fifth column at 298 represents links to additional blocks from the corresponding table entry. If messages are stored either contiguously or non-contiguously and require more than one block, the references to additional files are indicated in the preferred embodiment so that additional overhead in management of the allocate and release tables are not required. A sixth column shown at 300 indicates whether any of the blocks at 337 are currently allocated. If a block is allocated, the corresponding file is not available to store a message until it is released.

Message system 274 within host A 230 or message system 278 within host B 234 may determine from the number of file locations and the number of file and block sizes which one or more of the files or blocks are necessary to allocate to store a message. Thus, when the allocate and release tables at 290 are accessed by message system 274 or message system 278, the particular entries within the allocate and release tables at 290 will provide availability of file space. For example, the first column at 292 indicates a first table entry at 302 which corresponds to a file A at 304 having a file size of N1 times 112 words where N1 is the total number of 112 word blocks. It is understood that the indication of file A at 304 is representative of a reference to an address location, wherein file A resides. The block size of 112 words is a representative block size in the preferred embodiment of the present invention. It is understood that any file or block size may be accommodated, but that in many applications, the block size may be less than 1,000 words. Table 1 as indicated at 302 further indicates a link to block 2 at 308 and indicates being currently allocated at 310. Block 1 at 338 and block 2 at 339 are contiguously allocated. Block 1 at 338 is shown as currently allocated at 310 and block 2 at 339 is shown as currently allocated at 311. Block 3 and block N1 at 340 and 341 respectively are shown as not being allocated at 313 and 315.

The table entry at 322 indicates a third table which corresponds to file C at 324, where file C has a block size of 224 words indicated at 326 where N3 is the total number of blocks in file C, and has a link to block 3 as indicated at 328, and is currently allocated as indicated at 330. Block 2 at 347 and block N3 at 349 are not currently allocated as shown at 331 and 333 respectively. Thus block 1 at 346 and block 3 at 348 are allocated non-contiguously.

A second table entry at 312 indicates a reference to file B at 314, wherein file B has a block size of 448 words as indicated at 316, where N2 is the total number of blocks within file B at 314. Furthermore, file B has no links to other files as shown in the column at 298 and is currently not allocated as indicated in the column at 300. For the exemplary tables shown at 290, when message system 274 or message system 278 references the allocate and release tables at 290, table 1 at 302, table 2 at 312 and table 3 at 322 all have blocks available for allocation to store a message.

It is further understood that the allocate and release tables shown at 290 correspond to the allocate and release tables 250 shown in FIGS. 6 and 8, and the allocate and release tables 251 shown in FIG. 7. In the first column at 332, an entry for table J is indicated. The number of tables within allocate and release tables 290 may be any number of tables, and the last table as indicated at 332 may be any number. Likewise, the entry at 334 indicates file K, where K may be a file of any desired size as indicated at 336, where N may be any number. Furthermore, file K at 334 may have any desired number of blocks, where each block has any desired size.

Thus, any host may allocate any number of files or any number of blocks within the files to store messages by determining a message size of the message, and determining from the number of allocation tables as shown at 290 which of the number of files and number of blocks within the files are available to store the message by comparing the message size to the file size or block size so that the files may be allocated until the message has been stored. Thus, when one of host A 230 or host B 234 determines the size of the message before calling the allocate and release tables within extended processing complex 238, the extended processing complex may allocate contiguous number of block entries within a given table to accommodate the message. The extended processing complex may also allocate non-contiguous entries within a given table. The extended processing complex may also allocate entries within two or more tables.

Alternatively, either host A 230 or host B 234 may allocate one or more of the number of blocks within the allocate and release tables to store the message by receiving the message in a number of portions. Here, the number of portions comprise a total message, where each time the host receives one of the portions, the host determines a portion size and determines from the allocate and release tables at 290 which of the number of files and blocks within the files are necessary to store the portion by comparing the portion size to the available file size and available block size. The files are allocated until the portions have been stored in one or more of the number of blocks or one or more of the number files. When a message is allocated in portions, the processing to store the portions continues until the entire message is stored. The file space allocation for the complete message will be non-contiguous within the file when the message is allocated in portions.

In yet another approach, message system 274 within host A 230 or message system 278 within host B 234 may accumulate a number of portions, wherein the number of portions comprise a message. Once all the portions have been accumulated by the host, the host or message system may determine a message size and determine from the allocate and release tables which of the number of files and which of the number of blocks within the number of files are necessary to store the messages by comparing the message size to the available file and block sizes. The files are allocated until the messages has been stored in the number of files.

In still another approach, the extended processing complex may allocate files on a circular basis within each file. This insures the files are more fully used before using the previously allocated and released space. Circular allocation is useful with applications wherein previous messages can be recalled for a period of time if the message file space has not been reused. In addition, circular allocation algorithms may combine the allocation capability with the write file capability such that the message being received or created can be written into the newly allocated file space with one extended processing complex command.

These messages which are allocated may be output or input messages as discussed earlier. If the message is an output message, either message system 274 within host A 230 or message system 278 within host B 234 may receive the output message from the corresponding application, either application 276 or application 280, and allocate one or more of the number of blocks within a given allocate and release table to store the output message. Host A 230 or host B 234 determines from the allocate and release tables which one or more of the number of blocks to store the output message. The one or more of the number of blocks within the allocate and release table allocated to store the output message, which here are represented by block 1, block 2 etc. . . . through block N are released once the output message has been released to one of the users. In FIG. 8, the users are workstations 222 and 224 for host A 230, and workstations 226 and 228 for host B 234. The entry for the file which has been released will then indicate that the file has been released and is available to store another message.

If the message is an input message, the input message is received by host A 230 from a user, such as workstation 222 or workstation 224, or is received by host B 234 by either workstation 226 or workstation 228 (see also, FIG. 8). For host A 230, message system 274 receives the input message and allocates one or more of the number of blocks in the allocate and release tables to store the input message, where host A 230 determines from the allocation and release tables which one or more of the number of blocks to store the input message. Once the input message has been processed by the application, the allocate and release tables indicate that the one or more of the number of files allocated to store the input message are released.

Figure 10:
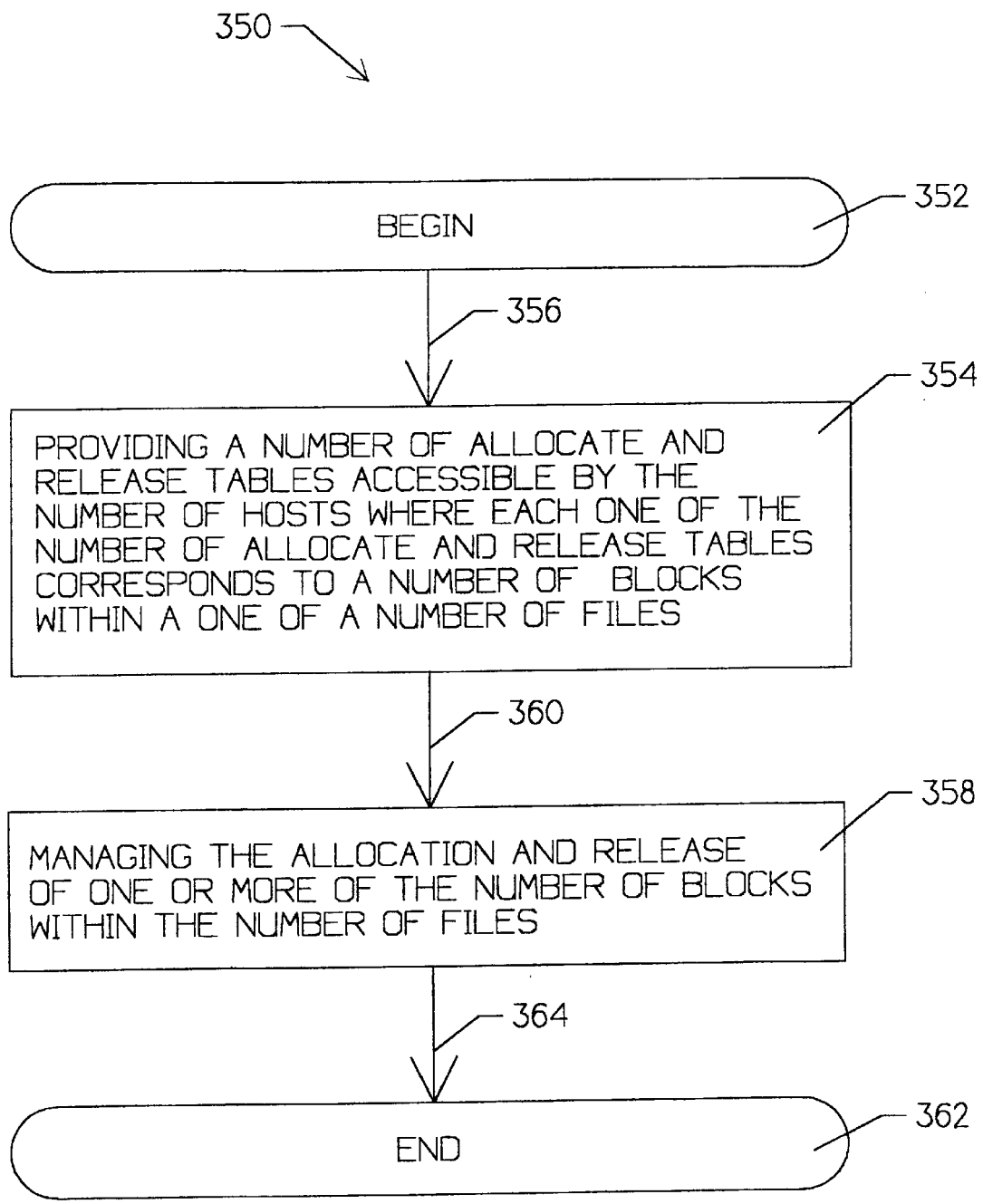
FIG. 10 is a flow diagram showing an exemplary method of the present invention.

FIG. 10 is a flow diagram showing an exemplary method of the present invention. The flow diagram shows a method for managing the allocation and release of memory space within a data processing system having a number of users coupled to a number of hosts. The flow diagram is shown generally at 350. The flow diagram is entered at element 352, wherein control is passed to element 354 via interface 356. Element 354 provides a number of allocation tables coupled to the number of hosts where each one of the number of allocation tables corresponds to a number of blocks within a one of a number of files. Control is then passed to element 358 via interface 360. Element 358 manages the allocation and release of one or more of the number of blocks within the one of the number of files. Control is then passed to element 362 via interface 364, where the algorithm is exited.

Figure 11A:
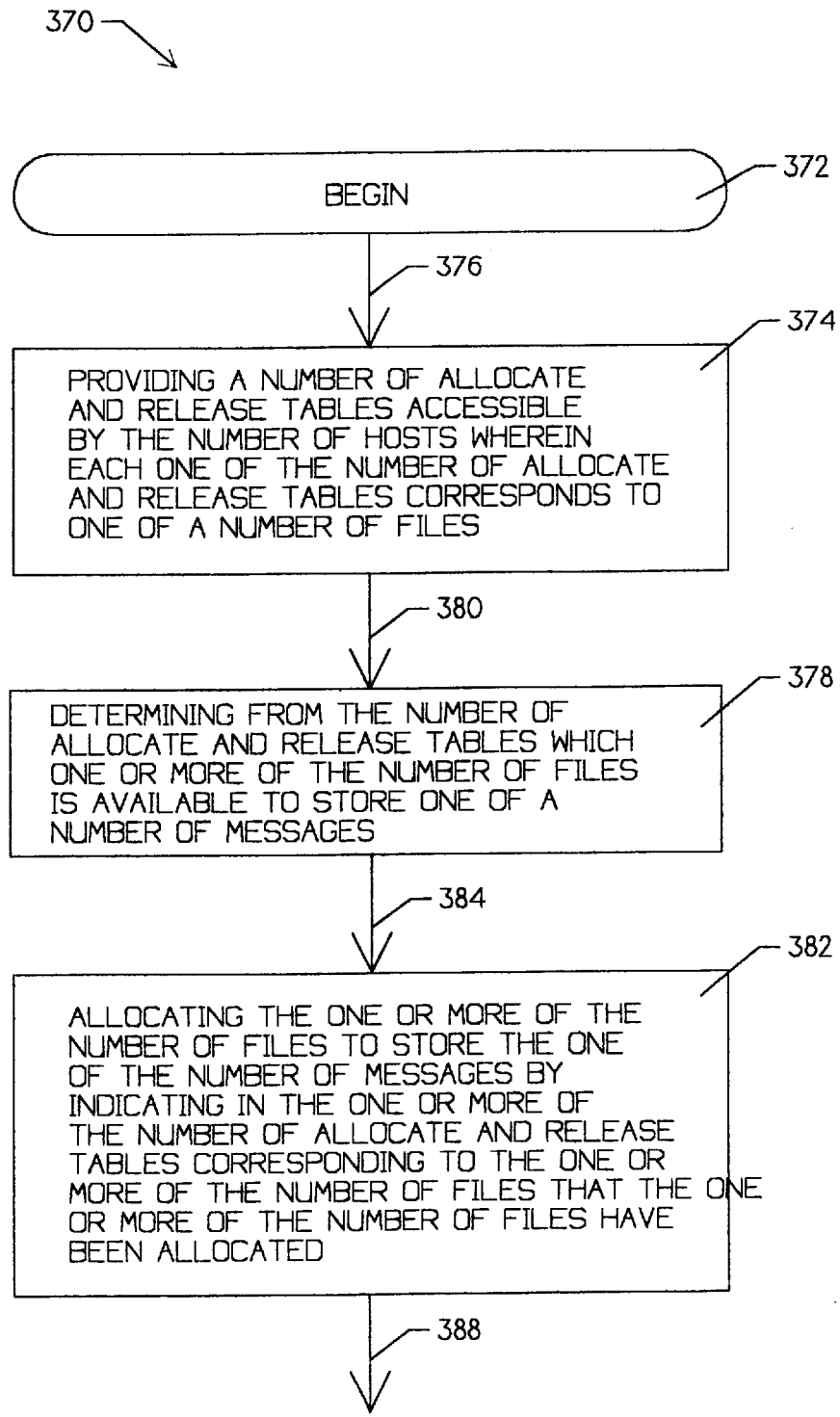
FIGS. 11A and 11B are a flow diagram showing a second exemplary method of the present invention.
Figure 11B:
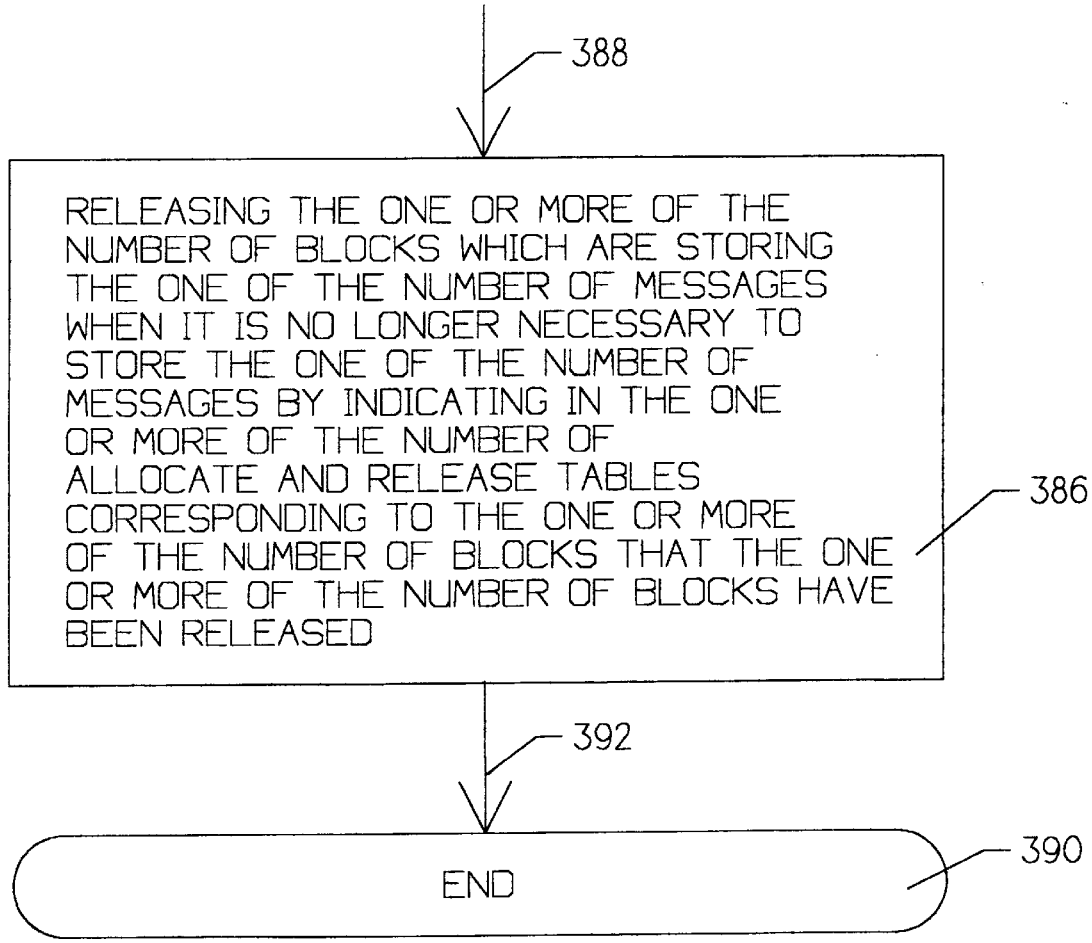

FIGS. 11A and 11B are a flow diagram showing a second exemplary method of the present invention. The flow diagram shows a method for managing the allocation and release of memory space within a data processing system having a number of users coupled to a number of hosts. The flow diagram is shown generally at 370.

The flow diagram is entered at 372, wherein control is passed to element 374 via interface 376. Element 374 provides a number of allocate and release tables accessible by the number of hosts, wherein each one of the number of allocate and release tables corresponds to a number of blocks within a one of a number of files. Control is then passed to element 378 via interface 380.

Element 378 determines from the number of allocate and release tables which one or more of the number of blocks within the one of the number of files is available to store one of a number of messages. The step at 378 may further comprise the step of the one of the number of hosts executing the application where the application creates the one of the number of messages which is an output message, and where the output message is to be released to one of a number of users. The step at 378 may further comprise the one of the number of hosts having a message system, where the message system receives the output message from the application and allocates one or more of the number of blocks to store the output message, where the one of the number of hosts determines from the number of allocate and release tables which one or more of the number of blocks to store the output message. In addition, the step at 378 may comprise the step of the host receiving an input message from one of the number of users, where the input message is to be processed by the application. The step at 378 may further comprise the one of the number of hosts having a message system, where the message system receives the input message from the one of the number of users and allocates one or more of the number of blocks within the one of the number of files to store the input message, and where the one of the number of hosts determines from the number of allocation tables which one or more of the number of blocks to store the input message. Control is then passed to element 382 via interface 384.

Element 382 allocates the one or more of the number of blocks to store the one of the number of messages by indicating in the one or more of the number of allocate and release tables corresponding to the one or more of the number of blocks that the one or more of the number of blocks have been allocated. Control is then passed to element 386 via interface 388.

Element 386 releases the one or more of the number of blocks which are storing the one of the number of messages when it is no longer necessary to store the one of the number of messages by indicating in the one or more of the number of allocate and release tables corresponding to the one or more of the number of blocks that the one or more of the number of blocks have been released. The step at 386 may further comprise the step of releasing the one or more of the number of files allocated to store the output message once the output message has been released to a one of the number of users, where the corresponding one or more of the number of allocate and release tables indicate that the corresponding one or more of the number of files allocated to store the output message have been released. In addition, the step at 386 may further comprise the step of releasing the one or more of the number of files allocated to store the input message once the input message has been processed by the application, where the corresponding one or more of the number of allocate and release tables indicates that the corresponding one or more of the number of files allocated to store the input message have been released. Control is then passed to element 390 via interface 392, where the algorithm is exited.

Having thus described the preferred embodiments of the present invention, those of skill in the art will readily appreciate that the teachings found herein may be applied to yet other embodiments within the scope of the claims hereto attached.

What is claimed is:

1. A data processing system having a number of users coupled to a number of hosts, comprising:
   a. a number of allocate and release tables accessible by the number of hosts for managing the allocation and release of space within a number of files which are shared by the number of hosts;
   b. wherein each one of the number of allocate and release tables corresponds to a one of the number of files;
   c. wherein a particular one of the number of hosts allocates the one or more of a number of blocks within the number of files to store a particular one of a number of messages, said particular one of the number of hosts determining from the number of allocate and release tables which one or more of the number of files to store said particular one of said number of messages; and
   d. wherein each one of the number of allocate and release tables further comprises a number of links to other ones of the number of blocks, said links indicating which other ones of the number of blocks within the one of the number of files have been allocated to store said particular one of the number of messages.

2. A data processing system according to claim 1 wherein each one of the number of allocate and release tables specifies a file location, a file size, and a block size, said particular one of the number of hosts determining from said file size and said block size which one or more of the number of blocks to allocate to store the particular one of the number of messages.

3. A data processing system according to claim 2 wherein each one of the number of allocate and release tables further comprises a number of indications of whether the corresponding number of blocks within the one of the number of files has been allocated, said number of indications indicating that the corresponding number of blocks has been released after the corresponding one of the number of files is no longer needed to store said particular one of the number of messages.

4. A data processing system according to claim 1 wherein the file size is equal to the sum of the size of each one of the number of blocks within the one of the number of files.

5. A data processing system according to claim 4 wherein one or more of the number of block sizes is less than 448 words.

6. A data processing system according to claim 1 wherein the number of allocate and release tables are stored in a common memory, said memory being accessible by the number of hosts.

7. A data processing system according to claim 6 wherein the common memory is a cache memory.

8. A data processing system according to claim 7 wherein the cache storage memory is located within an extended processing complex.

9. A data processing system according to claim 6 wherein the common memory is a main memory storage.

10. A data processing system according to claim 1 wherein the particular one of the number of hosts allocates the one or more of the number of blocks to store said particular one of the number of messages by determining a message size of said particular one of the number of messages and determining from the number of allocate and release tables which of the one or more of the number of blocks within a one of the number of files are necessary to store said particular one of the number of messages by comparing said message size to the one or more of the number block sizes within each one of the number of files, the one or more of the number of blocks being allocated until said particular one of the number of messages has been stored in the number of blocks.

11. A data processing system according to claim 10 wherein the one or more of the number of blocks are allocated contiguously to store said particular one of the number of messages.

12. A data processing system according to claim 1 wherein the particular one of the number of hosts allocates the one or more of the number of blocks within the one of the number of files to store the particular one of the number of messages by receiving the particular one of the number of messages in a number of portions, said number of portions comprising the particular one of the number of messages, each time the particular one of the number of hosts receives a one of said number of portions the particular one of the number of hosts determining a portion size of said one of said number of portions and determining from the number of allocate and release tables which of the one or more of the number of blocks within the one of the number of files are necessary to store said one of said number of portions by comparing said portion size to the one or more of the number of block sizes, the one or more of the number of blocks being allocated until said one of the number of portions has been stored in said one or more of the number of blocks.

13. A data processing system according to claim 12 wherein the number of portions are allocated non-contiguously within the number of blocks.

14. A data processing system according to claim 1 wherein the particular one of the number of hosts allocates the one or more of the number of blocks to store the particular one of the number of messages by receiving the particular one of the number of messages in a number of portions, said number of portions comprising the particular one of the number of messages, once all of said number of portions have been received by the particular one of the number of hosts, the particular one of the number of hosts determining a message size of the particular one of the number of messages and determining from the number of allocate and release tables which of the one or more of the number of blocks within the one of the number of files are necessary to store the particular one of the number of messages by comparing said message size to the one or more of the number of file block sizes, the one or more of the number of blocks being allocated until the particular one of the number of messages has been stored in the number of blocks.

15. A data processing system according to claim 14 wherein the one or more of the number of blocks are allocated contiguously to store the particular one of the number of messages.

16. A data processing system according to claim 1 wherein the particular one of the number of messages is an output message, the particular one of the number of hosts executing an application, said application creating said output message.

17. A data processing system according to claim 16 wherein each one of the number of hosts further comprises a message system, said message system receiving the output message from the application and allocating one or more of the number of blocks within the number of files to store the output message, the particular one of the number of hosts determining from the number of allocate and release tables which one or more of the number of blocks within the one of the number of files to store the output message.

18. A data processing system according to claim 17 wherein the one or more of the number of blocks within the one of the number of files allocated to store the output message are released after the output message has been released to a one of the number of users, each corresponding one or more of the number of allocate and release tables indicating that the corresponding one or more of the number of blocks allocated to store the output message have been released.

19. A data processing system according to claim 1 wherein the particular one of the number of messages is an input message, said input message being received by the particular one of the number of hosts from a one of the number of users.

20. A data processing system according to claim 19 wherein each one of the number of hosts further comprises a message system, said message system receiving the input message from the one of the number of users and allocating one or more of the number of blocks within the one of the number of files to store the input message, the particular one of the number of hosts determining from the lumber of allocate and release tables which one or more of the number of blocks to store the input message.

21. A data processing system according to claim 20 wherein the one or more of the number of blocks allocated to store the input message are released after the input message has been processed by an application, the particular one of the number of hosts executing said application, each corresponding one or more of the number of allocate and release tables indicating that the corresponding one or more of the number of blocks allocated to store the input message have been released.

22. A data processing system having a number of users coupled to a number of hosts, comprising:
   a. allocating means accessible by the number of hosts for allocating one or more of a number of blocks within one or more of a number of files to store one of a number of messages;
   b. releasing means coupled to the number of hosts for releasing said one or more of said number of blocks within said one or more of said number of files when said one or more of said number of blocks is no longer required to store said one of said number of messages;
   c. wherein the allocation means comprises a number of allocate and release tables coupled to the number of hosts for managing the allocation and release of space within the number of files which are shared by the number of hosts;
   d. wherein each one of the number of allocate and release tables corresponds to said one of the number of files;
   e. wherein a one of the number of hosts allocates one or more of the number of blocks within one or more of the number of files to store the ore of the number of messages, said one of the number of hosts determining from the number of allocate and release tables which one or more of the number of blocks within the one of more of the number of files to store the one of the number of messages;

f. wherein each one of the number of allocate and release tables specifies a file location, a file size and a block size, the one of the number of hosts determining from said file location, said file size and said block size which one or more of the number of blocks within which one or more of the number of files to allocate to store the one of the number of messages;

g. wherein each one of the number of allocate and release tables further comprises a number of indications indicating whether the corresponding one of the number of blocks within each one of the number of files has been allocated;

h. wherein the releasing means further comprises each one of the number of indications indicating that the corresponding one of the number of blocks within each one of the number if files has been released after the corresponding one of the number of blocks is no longer needed to store the one of the number of messages; and i. wherein each one of the number of blocks within each one of the number of allocate and release tables further comprises a number of links to other ones or more of the number of blocks within each ore of the number of allocate and release tables, said links indicating which other ones of the number of blocks have been allocated to store the one of the number of messages.

* * * * *

UNITED STATES PATENT AND TRADEMARK OFFICE
CERTIFICATE OF CORRECTION

PATENT NO. : 6,055,547
DATED : April 25, 2000
INVENTOR(S) : Cooper et al.

It is certified that error appears in the above-identified patent and that said Letters Patent is hereby corrected as shown below:

Column 16,
Line 37, thereof, delete "lumber" and insert therefor, -- number --.

Column 17,
Line 1, thereof, delete "ore" and insert therefor, -- one --.

Signed and Sealed this

Second Day of July, 2002

Attest:

Attesting Officer

JAMES E. ROGAN
Director of the United States Patent and Trademark Office